June 20, 1933.    W. A. ANDRES    1,914,795
OVERLOAD RELEASE CLUTCH
Filed Sept. 25, 1931

Inventor
William A. Andres
By Henry J. Miller
Attorney

Witness
Godfrey Pecina

Patented June 20, 1933

1,914,795

UNITED STATES PATENT OFFICE

WILLIAM A. ANDRES, OF BRIDGEPORT, CONNECTICUT, ASSIGNOR TO THE SINGER MANUFACTURING COMPANY, OF ELIZABETH, NEW JERSEY, A CORPORATION OF NEW JERSEY

OVERLOAD-RELEASE CLUTCH

Application filed September 25, 1931. Serial No. 565,017.

This invention relates to overload-release clutches, and has for its primary object to provide simple and effective means automatically operative when a predetermined load or torque is applied to the driven element, to disconnect the driven element, and thereby prevent undue strain and possible injury to the mechanism.

A further object of the invention is to provide improved means for re-connecting the driving element to the driven element after it has been disconnected therefrom.

Another object of the invention is to provide improved adjustable means for predetermining the maximum torque desired to be imparted to the driven element.

Another object of the invention is the provision of an improved clutch which will automatically disconnect the driven and driving elements from operative relation and maintain this inoperative relation until the driven and driving elements are re-connected by the operator.

Another object of the invention is to provide means for decreasing the torque required to disengage the elements once the predetermined torque is applied to the driven element.

Another object of the invention is to provide improved means whereby the member connecting the driven and driving elements is urged to disconnected position after it has been partially disengaged.

Another object of the invention is to provide improved means for moving the member connecting the driven and driving elements to an ineffective position out of contact with the driven member.

With the above and other objects in view, as will hereinafter appear, the invention consists in the devices, combinations, and arrangements of parts hereinafter set forth and illustrated in the accompanying drawing of a preferred embodiment of the invention, from which the several features of the invention and the advantages attained thereby will be readily understood by those skilled in the art.

Figure 1:
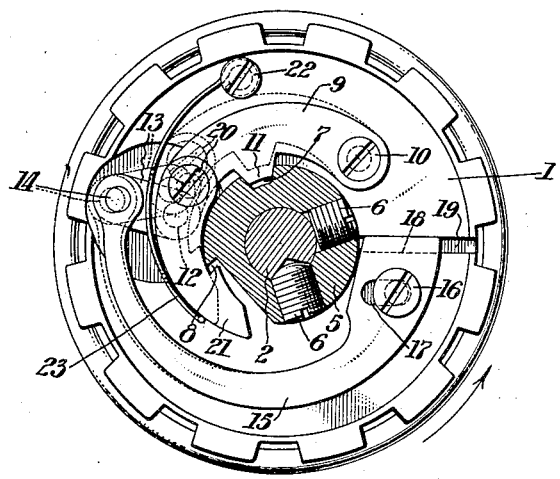
Fig. 1 is an end view showing the connecting means in driving relation.

In the embodiment of this invention selected for illustration, 1 is the driving element in the present instance in the form of a pulley adapted to be driven from any suitable source of power, and the shaft 2 represents the driven element on which the driving element is rotatably supported. It will be obvious that these parts may be interchanged or that other forms of power transmission elements may be substituted for either or both of them.

Abutting one edge of the hub of the driving element 1 is a collar 3 fixed to the shaft 2 by means of set screws 4. On the opposite side of the hub of the driving element and abutting it is another collar 5 fixed to the shaft 2 by any suitable means, shown in this embodiment as set screws 6. The driving element is confined against longitudinal movements upon the shaft between these two collars. The collar 5 has a recess 7 with inclined sides, and a shouldered recess 8 in the periphery thereof.

Pivotally secured at one end by a screw 10 to the face of the driving element is a link 9, which is provided with a wedge-shaped projection 11, adapted to enter the recess 7 in the collar 5. The other end of the link 9 is pivotally connected by the screw 12 to a second link 13. The opposite end of the link 13 is pivoted to the bow or arcuate spring 15 which is adjustably secured to the face of the driving element 1 by means of the screw 16 and the elongated slot 17. The extreme end 18 of the bow spring 15 is bent to form an angle of 90° with the body of the spring 15 and extends downwardly into the radially arranged channel 19 to positively hold the spring against any tendency to rotate about the pivot screw 16 and also to reduce the strain on the said screw.

To break the toggle and re-establish driving relation a pawl 21 is pivotally mounted at 20 upon the toggle link 9 adjacent the pivotal connection thereof. The pawl 21 is adapted to engage the shouldered recess 8 in the periphery of the collar 5. A light spring 23 which is secured by the stud 22 to the face of the driving element 1 yieldingly holds the pawl 21 in contact with the collar 5. The stud 22 acts as a stop for the link 9 when the toggle is in disengaged position, as shown in Fig. 2.

*Operation*

Figure 2:
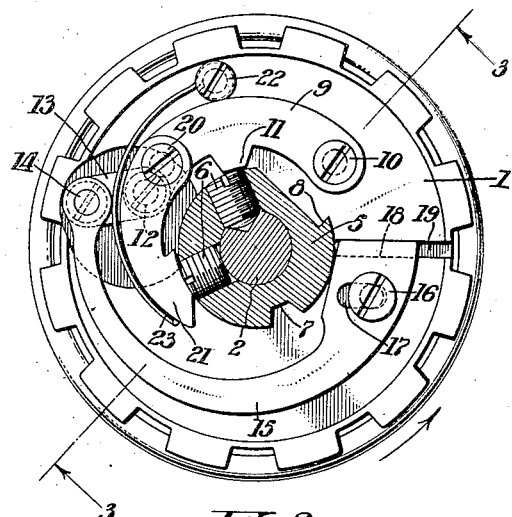
Fig. 2 is an end view showing the connecting means in disengaged position.
Figure 3:
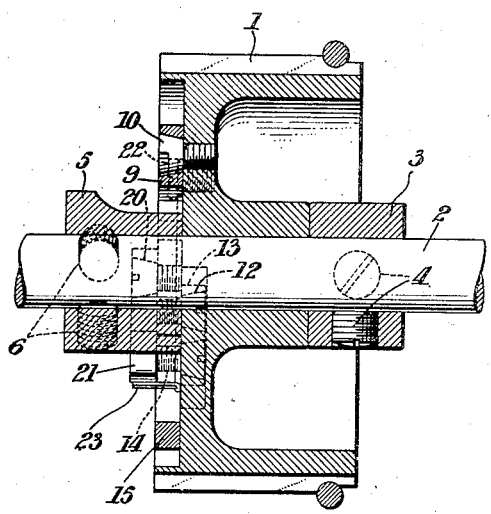
Fig. 3 is a section on the line 3—3 of Fig. 2.

The driving element 1 is driven in the direction indicated by the arrows in Figs. 1 and 2. When an excessive load or torque is applied to the element 2 the wedge-shaped projection 11 is forced out of the recess 7 in the collar 5 by the inclined wall, thereby aligning the pivot points and straightening the toggle, as shown in Fig. 2. Preferably, sufficient momentum is given the toggle when it is straightened to cause a slight reverse bending thereof, which is limited by the stud 22. The effect of this slight reverse bending of the toggle is to move the wedge-shaped projection on the link 9 to a position out of contact with the collar 5, as shown in Fig. 2. When the wedge-shaped projection 11 on the link 9 is moved to a position out of contact with the collar 5, the spring-pressed pawl 21 which is pivoted to the toggle link 9 is moved outwardly with the link 9, and the free end of the pawl rides freely over the periphery of the collar 5 in a counter-clockwise direction as long as the driving member overruns the driven member 2. It will be observed that the bow spring 15 acts in the direction of the fixed pivot 10 of the toggle link 9, the spring, therefore, tends to break the toggle both inwardly and outwardly. It will be obvious that the maximum force required to straighten the toggle is at the beginning of the straightening operation, diminishing as the pivot points approach alignment.

When it is desired to re-establish driving relation, the driving element is rotated in the reverse direction. When the shouldered recess 8 in the collar 5, engages the pawl 21 which is urged inwardly by the light spring 23, the pivotal point 12 of the toggle is pulled inwardly, breaking the toggle and thereby forcing the projection 11 on the link 9 into the wedge-shaped recess 7 in the collar 5.

In the preferred embodiment of the invention the shoulder 8 and the recess 7 are so spaced circumferentially on the collar 5 that the wedge-shaped projection 11 on the link 9 is in a position to directly enter the recess 7 when the pawl 21 acts to break the toggle inwardly.

From the foregoing description considered in connection with the accompanying drawing, the construction, manner of operation and several advantages of my improved overload-release clutch will be clearly and fully understood. It is apparent that such a device has a wide variety of uses, and it will be understood that the form, construction and arrangement of the several elements employed may be varied. Therefore, the privilege is reserved of resorting to all such legitimate changes therein as may be fairly embodied within the spirit and scope of the appended claims.

Having thus set forth the nature of the invention, what I claim herein is:—

1. An overload-release clutch comprising a rotatable driving element, a rotatable driven element, means for connecting said driving and driven elements, means for moving said connecting means to an inactive position when a predetermined load is applied to said driven element, and a pawl under control of said driven element for thereafter moving said connecting means to its active position.

2. The combination of rotatable driving and driven elements, means connecting said elements comprising members pivoted to form a toggle joint, and a bow spring pivoted to one of said members for breaking said toggle joint when the pivot points are not in alignment.

3. The combination of rotatable driving and driven elements, means for maintaining said elements in driving relation comprising members pivoted to form a toggle joint, a bow spring pivoted to one of said members for breaking said toggle joint when the pivot points are not in alignment, and means for predetermining the force required to align said pivot points against the action of said spring.

4. The combination of rotatable driving and driven elements, a toggle joint for connecting said elements in driving relation, said toggle joint comprising a link having one end pivotally secured to one of said elements and provided with a projection adapted to enter a recess with an inclined side in the other of said elements, a second link pivoted to the free end of the first mentioned link, and a bow spring pivotally connected to said second link, said bow spring being adjustably secured to said first mentioned element and acting in a direction towards the fixed pivotal-axis of the first mentioned link.

5. In a device of the class described in combination, rotatable driven and driving elements, a toggle joint adapted to maintain driving relation between said elements when said toggle joint is broken, means for straightening said toggle joint when an abnormal load is applied to one of said elements, and means for thereafter breaking the toggle and re-establishing driving relation upon reverse rotation of either element.

6. An overload-release clutch comprising, rotatable driving and driven elements, a yielding connection between said elements, said connection comprising a toggle having one end pivoted to one of said elements, and a resilient member pivoted to the other end of said toggle, means for rendering said connection ineffective when an abnormal load is applied to one of said elements, and means for thereafter rendering said connection effective by reverse rotation of one of said elements.

7. An overload-release clutch comprising, a rotatable driving element, a rotatable driven element, a yielding toggle joint carried by one of said elements and engaging the other of said elements to connect said elements in driving relation, means for moving said toggle joint to an inactive position when an abnormal load is applied to one of said elements, and means for thereafter moving said toggle joint to its active position by reverse rotation of one of said elements.

8. An overload-release clutch comprising, rotatable driving and driven members, a yielding toggle device carried by one of said members, an element of said toggle device and the other of said members having interengaging walls which coact to straighten the toggle and disengage said walls under an overload condition in a given direction of rotation, and means for automatically breaking said toggle upon reverse rotation of one of said members, said means including a pawl carried by said toggle device and a pawl actuator carried by the other of said members.

In testimony whereof I have signed my name to this specification.

WILLIAM A. ANDRES.